United States Patent [19]

Sowerby et al.

[11] Patent Number: 4,764,297

[45] Date of Patent: Aug. 10, 1988

[54] PROTIC SOLVENT IN A DEHYDROHALOGENATION PROCESS, THE PRODUCT OBTAINED THEREFROM AND LUBRICANT COMPOSITIONS CONTAINING SAME

[75] Inventors: Roger L. Sowerby, Mentor; Stephen A. DiBiase, Euclid, both of Ohio

[73] Assignee: The Lubrizol Corporation, Wickliffe, Ohio

[21] Appl. No.: 28,515

[22] Filed: Mar. 20, 1987

[51] Int. Cl.$^4$ .......................................... C10M 135/04
[52] U.S. Cl. ........................................ 252/45; 568/21
[58] Field of Search ............................ 252/45; 568/21

[56] References Cited

U.S. PATENT DOCUMENTS

| | | | |
|---|---|---|---|
| 2,322,258 | 6/1945 | Strosacker et al. | 260/654 |
| 2,708,199 | 5/1955 | Eby | 568/21 |
| 3,471,404 | 10/1969 | Myers | 252/45 |
| 3,627,794 | 12/1971 | Grimm et al. | 568/21 |
| 3,697,499 | 10/1972 | Myers | 260/139 |
| 3,703,504 | 11/1972 | Horodysky | 260/139 |
| 3,706,724 | 12/1972 | Blanchard et al. | 260/94.9 |
| 3,862,991 | 1/1975 | Hageman | 260/608 |
| 4,200,546 | 4/1980 | Horodysky | 252/46.4 |
| 4,225,488 | 9/1980 | Horodysky et al. | 252/45 |
| 4,284,520 | 8/1981 | Bolle et al. | 568/21 |

*Primary Examiner*—William R. Dixon, Jr.
*Assistant Examiner*—Jerry D. Johnson
*Attorney, Agent, or Firm*—Karl Bozicevic; Denis A. Polyn; Robert A. Franks

[57] ABSTRACT

A process for producing a sulfurized olefin product substantially free of ash containing waste is disclosed. The process involves dehydrohalogenation of an olefin/sulfur halide complex by contacting the complex with a protic solvent in the absence of any metal ion. The process allows for the solvolytic dehydrohalogenation of the complex. The sulfurized olefin product obtained is isolated and may be subjected to further processing to remove any remaining halides. The resulting sulfurized olefin is a useful additive in lubricating oils.

21 Claims, No Drawings

PROTIC SOLVENT IN A DEHYDROHALOGENATION PROCESS, THE PRODUCT OBTAINED THEREFROM AND LUBRICANT COMPOSITIONS CONTAINING SAME

FIELD OF THE INVENTION

The present invention relates generally to a dehydrohalogenation process and the products obtained therefrom. In accordance with the process, halogen is removed from an alkylene/sulfur halide complex. More specifically, the invention relates to a process for the dehydrochlorination of an isobutylene/sulfur chloride complex and the dechlorinated product (i.e., the sulfurized olefin) obtained from such a process, as well as lubricants and concentrates containing the product as a performance improving additive.

BACKGROUND OF THE INVENTION

Sulfurized olefin compounds are widely produced and are known to be effective extreme pressure agents or load carrying additives for lubricating oils. (See U.S. Pat. Nos. 3,703,504; 3,697,499 and 3,471,404.) These sulfurized olefins may be obtained by sulfohalogenating a hydrocarbon olefin with a sulfur halide such as a sulfur chloride to form an alkylene sulfohalogenated complex. This complex can be further sulfurized such as by treating with an aqueous alkali metal monosulfide solution (see U.S. Pat. No. 3,703,504) and dehalogenating.

U.S. Pat. No. 4,200,546 discloses a process wherein sulfurized olefins are obtained via a process which comprises sulfohalogenating an olefin with a sulfur halide in the presence of a catalytic quantity (i.e., 0.2–10 wt.% based on the halide) of the lower aliphatic alcohol having up to above 10 carbon atoms (e.g., methanol, ethanol, propanol, i-propanol, butanol, i-butanol, etc.) to form a sulfohalogenated organic intermediate, and thereafter sulfurizing and dehalogenating said intermediate in the presence of a substantial quantity of lower aliphatic alcohol, e.g., from 10 to about 50% by weight of the adduct by treatment with an aqueous alkali metal sulfide solution, or an aqueous alkali metal monosulfide solution (which can be derived, for example, from a spent aqueous alkali metal hydroxide effluent from hydrocarbon purification) having a substantial combined sulfur content, thus producing an organic sulfide of high combined sulfur content.

U.S. Pat. No. 3,703,504, like the above referred to patent, discloses a process which comprises sulfohalogenating an olefin. The process is carried out with a sulfur halide in the presence of a catalytic quantity of a lower aliphatic alcohol to form a sulfohalogenated organic intermediate, and thereafter sulfurizing and dehalogenating said intermediate in the presence of a substantial quantity of a lower aliphatic alcohol by treatment with an aqueous alkali metal monosulfide solution derived from a spent aqueous alkali metal hydroxide effluent from hydrocarbon purification and having a substantial combined sulfur content in producing an organic sulfide of high combined sulfur content.

U.S. Pat. No. 3,706,724 discloses a process comprising (1) preparing a catalyzed chlorinated polyolefin by substantially uniformly admixing from about 0.25 to 0.5 part by weight of a Lewis acid per 100 parts of a comminuted chlorinated polyolefin (phr.), (2) maintaining the catalyzed chlorinated polyolefin in the form of the fluidized bed in the presence of a substantially inert gas and further in the presence of from about 2 to 5 phr. of an inert filler which has an affinity for adsorption onto the surfaces of the chlorinated polyolefin, (3) heating the fluidized bed to a temperature sufficient to produce the dehydrochlorination reaction without burning or charring the chlorinate polyethylene being dehydrochlorinated, then (4) cooling the fluidized bed and recovering the dehydrochlorinated product.

U.S. Pat. No. 3,862,991 discloses a bis(beta-chlorobeta-arylalkyl)disulfide, which is made by reacting sulfur monochloride with a beta-arylolefin selected from the group consisting of styrene, alpha-methyl styrene, p-tert-butyl styrene, o-chlorostyrene, p-chlorostyrene, vinyltoluene, anethole, 1,2-dihydroanaphthalene, acenaphthalene, 1-phenylcyclohexane and indene.

U.S. Pat. No. 2,322,258 discloses heating an olefin with a solution of potassium hydroxide in a monohydric alcohol such as ethanol. Polyhydric alcohols and hydroxy ethers are used for splitting a hydrogen halide from the molecule of a halogenated organic compound with an alkali. By carrying such reaction out in the presence of a polyhydric alcohol or a hydroxy ether, either sodium hydroxide or potassium hydroxide may be used as the alkaline reactant and the latter may be employed in solid form or dissolved in an alcohol or water, as desired.

SUMMARY OF THE INVENTION

The invention generally relates to a dehydrohalogenation process whereby halogens are removed from the reaction product obtained when sulfurizing an olefin with a sulfur halide. For example, the invention includes a process whereby chlorine is removed from the reaction product obtained by sulfurizing an olefin with a sulfur chloride. In accordance with the process of this invention, an olefin such as isobutene is reacted with a sulfur chloride to obtain an isobutene sulfur chloride complex. The complex obtained is then contacted with a protic solvent such as water and isopropyl alcohol in the absence of any metal, providing a sulfurized olefin product which is substantially free of chlorine or any ash (metal) containing contaminants.

A primary object of this invention is to provide an improved dehydrohalogenation process.

Another object is to provide an improved method for obtaining a sulfurized olefin composition.

Another object of this invention is to provide a sulfurized olefin product produced by utilizing an improved dehydrochlorination process.

A feature of the process of the present invention is that dehydrochlorination can be carried out in a manner which reduces waste by-products such as ash (metal) containing contaminants.

An advantage of this invention is that it provides a dehydrohalogenation process which can be carried out in a simple, economical and environmentally advantageous manner.

Another feature of this invention is that sulfurized olefin compositions obtained can be used in various lubricant oils and functional fluids.

These and other objects, advantages and features of the present invention will become apparent to those persons skilled in the art upon reading the details of the method, structure and usage as more fully set forth below. Reference being made to the accompanying general structural formulae forming a part hereof wherein like symbols refer to like molecular moieties throughout.

In order to clearly describe and disclose the present invention some of the terms used in the description and claims will be specifically defined. The dehydrohalogenation step of the invention may be carried out "in the absence of any metal ions." This is intended to indicate that no metal contaminant salts which might form metal ions are added to the reaction. However, some contaminants may be present in trace amounts. The amounts of metal ions present would be expected to vary depending on the reactants used and their purity. In one embodiment of the invention dehydrohalogenation may be carried out "in the presence of a catalytic amount of metal ions." This is intended to mean that metal ions are present in less than molar amounts based on the molar amount of complex being dehydrohalogenated and further that the catalytic amount present is present in its original form and amount at the end of the reaction, i.e. the catalytic amount does not alter the final product but only affects the rate of reaction. The term "ash containing" is a term of art meaning metal containing.

DETAILED DESCRIPTION OF THE PREFERRED EMBODIMENTS OF THE INVENTION

Before the present dehydrohalogenation process is described, it is to be understood that this invention is not limited to the particular compounds or process steps described as such compounds and methods may, of course, vary. It is also understood that the terminology used herein is for the purpose of describing particular embodiments only, and is not intended to be limiting since the scope of the present invention will be limited only by the appended claims.

A unique composition of sulfurized olefins is produced by a process in accordance with the present invention. Although some of the molecules of the composition are themselves known, the composition itself is a unique blend of molecules, which blend can only be obtained by the process of the present invention. The complexity of this unique blend of molecules requires such be described in terms of the process by which such is produced and/or by spectrographic analysis.

The unique composition of the present invention is produced by the present inventive process which is surprisingly simple, efficient and economical. In general, the present process involves combining an olefin with a sulfur halide compound to obtain an alkylene sulfur halide complex. The reaction product complex obtained is then subjected to a protic solvent in the absence of any metal, i.e., ash producing component. The halogens are thereby removed from the reaction product leaving a sulfurized olefin composition of unique character.

An embodiment of the present invention as applied to specific molecules can be describes as a dehydrochlorination process of an isobutylene/sulfur monochloride complex, which complex is the reaction product obtained by reacting isobutylene with sulfur monochloride. The dehydrochlorination of the reaction product is carried out by subjecting this reaction product (i.e., isobutylene/sulfur monochloride complex) to heat in the presence of a protic solvent (preferably acetic acid, isopropanol and/or H$_2$O) with or without a catalyst in order to effect dehydrochlorination. This step removes a substantial amount of the chlorine and the product is useful in this form without further processing. However, the product can be isolated and this step repeated in order to remove any remaining chlorine. Alternatively, sodium hydroxide and/or Na$_2$S$_x$ is added in order to remove any remaining chlorine. After the chlorine has been removed, the product may be further sulfurized by contacting the product with elemental sulfur in the presence of heat and a catalyst. After the initial contact is carried out, further processing may not be required if the halide content has been reduced to less than the desired maximum level, e.g. about 0.5% by weight.

The essence of the invention is a dehydrohalogenation step. This step is generally carried out as a part of a process for producing a sulfurized olefin. The process generally involves reacting an olefin with a sulfur halide to obtain an alkyl/sulfur halide complex. This complex is contacted with a protic solvent to carry out dehydrohalogenation of the complex. A sulfurized product is obtained which is substantially free of any halide, i.e. the product obtained has had enough of the halide removed so that it is useful as a lubricant additive. In some cases the sulfurized product can be isolated and used as is after a single contact. However, it is preferably subjected to further dehydrohalogenation via (1) again contacting with a protic solvent, e.g. an additional charge of water or (2) contacting with an inorganic caustic, for example, sodium hydroxide, Na$_2$S$_x$ and others.

A very specific example of how the entire process might be carried out is shown below with reference to specific compounds and structures. Again the present invention is in no way restricted to the specific compound or steps shown below. It should be noted that hydrogens sufficient to satisfy carbon valences are present.

Step #1

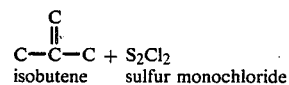
isobutene       sulfur monochloride

The reaction products are isobutylene/sulfur chloride complexes in a variety of forms, the structure of one such complex might be as follows:

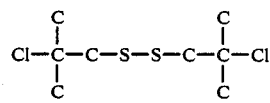

Step #2
isobutylene/sulfur chloride complex + protic solvent (e.g., isopropyl alcohol) heat The reaction products are dehydrochlorinated compounds in a variety of forms, the structure of one such compound might be as follows:

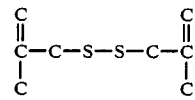

The resulting sulfurized compound is substantially free of chlorine.

Optional Steps

Isolate the sulfurized compound and add an inorganic caustic such as NaOH and/or $Na_2S_x$ (wherein x is generally 1 or 2) to remove remaining Cl or isolate the sulfurized compounds and repeat the dehydrohalogenation step, i.e. repeat step #2 above. In step #2 the protic solvent may be water. After the first contact with water, phase separation can be carried out to remove the water and additional water added. Then the additional water can be removed and a dehydrating catalyst added and the mixture heated under vacuum, e.g. add a sulfonated polystyrene such as Amberlyst 15.

Essential features of this specific embodiment of the invention are (1) contacting the isobutylene/sulfur monochloride complex with the protic solvent in the presence of heat in order to effect dehydrochlorination; and (2) carrying out dehydrohalogenation without the use of a metal containing reactant. These procedures increase the efficiency of the dehydrochlorination process and substantially eliminate ash containing waste products.

A wide variety of olefinic substances may be charged to the initial sulfochlorination reaction including hydrocarbon olefins having a single double bond with terminal or internal double bonds and containing from about 2 to 30 or more, preferably 2 to 8 carbon atoms per molecule in either straight, branched chain or cyclic compounds, and these may be exemplified by ethylene, propylene, butene-1, cis and trans butene-2, isobutylene, diisobutylene, triisobutylene, pentenes, cyclopentene, cyclohexene, the octenes, decene-1, etc. In general, $C_{3-6}$ olefins or mixtures thereof are desirable for preparing sulfurized products for use as extreme pressure additives as the combined sulfur content of the product decreases with increasing carbon content yet its miscibility with oil is lower for propylene and ethylene derivatives.

In some embodiments of the invention, isobutylene is particularly preferred as the sole olefinic reactant, but it may be employed, desirably in major proportion, in mixtures containing one or more other olefins; moreover, the charge may contain substantial proportions of saturated aliphatic hydrocarbons as exemplified by methane, ethane, propane, butanes, pentanes, etc. Such alkanes are preferably present in minor proportion in most instances to avoid unnecessary dilution of the reaction, since they neither react nor remain in the products but are expelled in the off-gases or by subsequent distillation. However, mixed charges can substantially improve the economics of the present process since such streams are of lower value than a stream of relatively pure isobutylene.

The other reactant in the first stage is the sulfurizing agent. This agent may be selected from compounds such as sulfur monochloride ($S_2Cl_2$); sulfur dichloride; and $S_3Cl_2$ as well as the corresponding but more expensive sulfur bromides. The sulfurizing agent may be employed in an amount which will provide the desired quantity of sulfur. The amount of sulfurization desired will vary depending on the end use of the product and can be determined by one of ordinary skill in the art. The molar ratio of olefin to sulfur halide will vary depending on the amount of sulfurization desired in the end product and the amount of olefinic unsaturation. The molar ratio of sulfur halide to olefin could vary from 1:(1-20). When the olefin to be sulfurized contains a single double bond, one mole of the olefin can be reacted with 0.5 moles or less of $S_2Cl_2$ (sulfur monochloride). The olefin is generally added in excess with respect to the amount of the sulfur being added so that all of the sulfur halide will be reacted and any unreacted olefin can remain as unreacted diluent oil or can be removed and recycled.

An olefin or mixture of olefins and a sulfur halide or mixture of sulfur halides are sufficiently reacted to form an olefin/sulfur halide complex. The reaction product is brought into contact with a protic solvent. The protic solvent may be water alone or a combination of water with a lower aliphatic alcohol or carboxylic acid containing from 1 to 18 carbon atoms, as exemplified by methanol, ethanol, propanol and isopropanol, hexanol and acetic acid. Of these, methanol, isopropanol and acetic acid are usually preferred. A solvent in amounts ranging from about 10 to 90% of the weight of the total solution may be utilized, but quantities on the order of 20 to 80% are usually preferred. The molar ratio of the protic solvent to the olefin/sulfur halide complex may range from (1-10):(1-10) but is preferably (1-5):(1-10) and more preferably about (1):(1).

The solvolytic dehydrohalogenation step of the invention is carried out in the absence of ash containing (metal) contaminants. It is understood that small amounts of such contaminants may incidentally be present as impurities in one or more of the reactants. The protic solvent must thoroughly interact with the reaction product (i.e., the product obtained by reacting the olefin and sulfur halide) in an environment maintained completely free of all metal, i.e., free of all ash producing metal ions such a sodium ions. The protic solvent interacts with the olefin/sulfur halide complex and results in solvolytic dehydrohalogenation which removes 90% or more of the halide in the form of an acid HX where X is a halide such as chlorine or bromine.

Accordingly, the solvolytic dehydrohalogenation is affected by the protic solvent resulting in a composition of sulfurized olefin which is substantially free of halide and any ash containing contaminants. Remaining halide can then be removed by the addition of compounds classified as "inorganic caustics" or by isolating the sulfurized olefin and repeating the solvolytic dehydrohalogenation one or more times.

When the chlorine has been reduced to the selected level, the reaction mixture is allowed to stand and separate into an aqueous hydrogen chloride layer and another liquid layer containing the desired organic sulfide product. The product is usually dried by heating at moderately elevated temperatures under subatmospheric pressure, and its clarity may often be improved by filtering the dried product through a bed of bauxite, clay or diatomaceous earth particles.

The following examples are provided so as to provide those of ordinary skill in the art with a complete disclosure and description of how to make the compounds and compositions of the invention and are not intended to limit the scope of what the inventors regard as their invention. Efforts have been made to insure accuracy with respect to numbers used (e.g. amounts, temperature, etc.) but some experimental errors and deviation should be accounted for. Unless indicated otherwise, parts are parts by weight, temperature is in degrees C., and pressure is at or near atmospheric. When considering the following Examples it will become apparent to those skilled in the art that the initial reaction product obtained by reacting the olefin and the sulfur monochloride could be modified in a number of ways. For example, different olefins and/or mixtures of olefins could be used as could different sulfurizing agents. Further, the reaction could be carried out in the presence of a number of different catalysts.

EXAMPLE 1

Add to a four neck flask about 375 grams (3 molar equivalents) of the reaction product obtained by reacting isobutylene and sulfur monochloride. Then add about 138 grams (3 molar equivalents) of formic acid. Heat to about 80° C. and purge the mixture with nitrogen bubbling. Continue for about 5 to 6 hours or until the total theoretical amount (about 109.5 g) of HCl has evolved off. Remove the formic acid by distilling at subatmospheric pressure. Filter and obtain sulfurized isobutylene product.

EXAMPLE 2

Add to a four neck flask about 5 mole equivalents of the reaction product obtained by reacting isobutylene and sulfur monochloride. Then add about 5 molar equivalents of formic acid. Heat to a temperature in the range of from about 60° C. to about 160° C. and purge the mixture with nitrogen bubbling. Continue for about 2 to 10 hours until the total theoretical amount of HCl has evolved off. Remove the formic acid by distilling at subatmospheric pressure. Filter and obtain sulfurized isobutylene product.

EXAMPLE 3

Add to a four neck flask about one molar equivalent of the reaction product obtained by reacting 1-pentene and sulfur monochloride. Then add about one molar equivalent of formic acid. Heat to about 80° C. and purge the mixture with nitrogen bubbling. Continue for about 5 to 6 hours or until the total theoretical amount of HCl has evolved off. Strip and filter to obtain sulfurized product.

EXAMPLE 4

Add to a four neck flask about 2 molar equivalents of the reaction product obtained by reacting isobutylene and sulfur monochloride. Then add about 2 molar equivalents of acetic acid. Heat to about 80° C. and purge the mixture with nitrogen bubbling. Continue for about 5 to 6 hours or until the total theoretical amount of HCl has evolved off. Strip and filter to obtain sulfurized isobutylene product.

EXAMPLE 5

Add to a four neck flask about 10 molar equivalents of the reaction product obtained by reacting isobutylene and sulfur monochloride. Then add about 10 molar equivalents of ethanol. Heat to about 80° C. and purge the mixture with nitrogen bubbling. Continue for about 4 to 8 hours or until the total theoretical amount of HCl has evolved off. Strip and filter to obtain sulfurized isobutylene product.

EXAMPLE 6

Add to a four neck flask about 1 molar equivalent of the reaction product obtained by reacting 1-pentene and sulfur monochloride. Then add about 1 molar equivalent of acetic acid. Heat to about 80° C. and purge the mixture with nitrogen bubbling. Continue for about 2 to 7 hours or until the total theoretical amount of HCl has evolved off. Strip and filter to obtain sulfurized product.

EXAMPLE 7

Add to a four neck flask about 2 molar equivalents of the reaction product obtained by reacting isobutylene and sulfur monochloride. Then add about one molar equivalent of ethanol and one molar equivalent of water. Heat to about 100° C. and purge the mixture with nitrogen bubbling. Continue for about 4 to 8 hours or until the total theoretical amount of HCl has evolved off. Strip and filter to obtain sulfurized isobutylene product.

EXAMPLE 8

Add to a four neck flask about 5 molar equivalents of the reaction product obtained by reacting isobutylene and sulfur monochloride. Then add about 5 molar equivalents of formic acid and about 0.5 molar equivalents of $ZnCl_2$ as catalyst. Heat until boiling and purge the mixture with nitrogen bubbling. Continue for about 2 to 4 hours until the total theoretical amount of HCl has evolved off. Strip and filter to obtain sulfurized isobutylene product.

EXAMPLE 9

Add to a four neck flask about one molar equivalent of the reaction product obtained by reacting 1-pentene and sulfur monochloride. Then add about one molar equivalent of formic acid and about 0.25 molar equivalents of $ZnCl_2$ as catalyst. Heat to about 80° C. and purge the mixture with nitrogen bubbling. Continue for about 1 to 3 hours or until the total theoretical amount of HCl has evolved off. Strip and filter to obtain sulfurized product.

EXAMPLE 10

Add to a four neck flask about 2 molar equivalents of the reaction product obtained by reacting isobutylene and sulfur monochloride. Then add about 2 molar equivalents of water and 0.5 molar equivalents of $ZnCl_2$ as catalyst. Heat to about 100° C. and purge the mixture with nitrogen bubbling. Continue for about 2 to 4 hours or until the total theoretical amount of HCl has formed off. Separate, strip and filter to obtain sulfurized isobutylene product.

EXAMPLE 11

Add to a four neck flask about 10 molar equivalents of the reaction product obtained by reacting isobutylene and sulfur monochloride. Then add about 5 molar equivalents of ethanol and 6 molar equivalents of water. Heat until boiling and purge the mixture with nitrogen bubbling. Continue for about 4 to 8 hours until the total theoretical amount of HCl has evolved off. Strip, filter and obtain sulfurized isobutylene product.

EXAMPLE 12

Add to a four neck flask about 1 molar equivalent of the reaction product obtained by reacting 1-pentene and sulfur monochloride. Then add about 0.25 molar equivalents of normal butanol and 0.65 molar equivalents of water. Heat to boiling and purge the mixture with nitrogen bubbling. Continue for about 4 to 8 hours or until HCl is no longer being evolved off. Strip, filter and obtain sulfurized product which will include some chlorine.

EXAMPLE 13

Add to a four neck flask about 2 molar equivalents of the reaction product obtained by reacting isobutylene and sulfur monochloride. Then add about 2 molar equivalents of ethanol and two molar equivalents of water and 0.03 molar equivalents of $H_2PO_4$ as catalyst. Heat to about 100° C. and purge the mixture with nitrogen bubbling. Continue for about 4 to 8 hours or until the total theoretical amount of HCl has evolved off. Strip, filter and obtain sulfurized isobutylene product.

EXAMPLE 14

Add to a four neck flask about 5 molar equivalents of the reaction product obtained by reacting isobutylene and sulfur monochloride. Then add about 8 molar equivalents of amyl alcohol. Heat to boiling to purge the mixture with nitrogen bubbling. Continue for about 5 to 7 hours until the total theoretical amount of HCl has evolved off. Strip, filter and obtain sulfurized isobutylene product.

EXAMPLE 15

Add to a four neck flask about one molar equivalent of the reaction product obtained by reacting 1-pentene and sulfur monochloride. Then add about one molar equivalent of water. Heat to about 100° C. and purge the mixture with nitrogen bubbling. Continue for about 5 to 10 hours or until the total theoretical amount of HCl has formed. Separate, strip, filter and obtain sulfurized product.

EXAMPLE 16

Add to a four neck flask about 2 molar equivalents of the reaction product obtained by reacting isobutylene and sulfur monochloride. Then add about 30 molar equivalents of water. Heat to about 100° C. and purge the mixture with nitrogen bubbling. Continue for about 2 to 4 hours or until the total theoretical amount of HCl has formed. Separate, strip, filter and obtain sulfurized isobutylene product.

EXAMPLE 17

Add to a four neck flask about 2 molar equivalents of the reaction product obtained by reacting isobutylene and sulfur monochloride. Then add about 20 molar equivalents of water. Heat to about 100° C. and purge the mixture with nitrogen bubbling and continue heating for 2 to 4 hours. Allow for phase separation and then remove the water. Add an additional 20 molar equivalents of water and heat to 100° C. for 6 to 18 hours. Again allow for phase separation and remove the water. Add a dehydrating catalyst (e.g. Amberlyst 15) and heat under vacuum to 100° C. for about 1 to 2 hours. Separate, strip, filter and obtain product.

EXAMPLE 18

Add to a four neck flask about one molar equivalent of the reaction product obtained by reacting 1-pentene and sulfur monochloride. Then add about 0.5 molar equivalents of water. Heat to about 100° C. and purge the mixture with nitrogen bubbling and maintaining for about 5 to 10 hours. Allow for phase separation and remove water. Add a dehydrating catalyst in the form of a sulfonated polystyrene and heat under vacuum to 100° C. for 2 to 4 hours. Strip, filter and obtain sulfurized product.

EXAMPLE 19

Add to a four neck flask about 2 molar equivalents of the reaction product obtained by reacting isobutylene and sulfur monochloride. Then add about 30 molar equivalents of water. Heat to about 100° C. and purge the mixture with nitrogen bubbling. Allow for phase separation and remove the water. Add another 30 molar equivalents of water and heat for 5 to 10 hours at about 100° C. Strip, filter and obtain sulfurized isobutylene product.

EXAMPLE 20

Add to a four neck flask about one molar equivalent of the reaction product obtained by reacting a mixture of alpha-olefins (3-7 carbons) and sulfur monochloride. Then add about one molar equivalent of water. Heat to about 100° C. and purge the mixture with nitrogen bubbling for about 5 to 10 hours. Allow for phase separation and remove water. Add 10 molar equivalents of water and heat to about 100° C. for about 12 to 24 hours. Allow for phase separation and remove water. Add a dehydrating catalyst in the form of a sulfonated polystyrene and heat under vacuum at about 100° C. for 2 to 10 hours. Strip, filter and obtain product.

EXAMPLES 21-40

The sulfurized product obtained from examples 1-20 can be added to an oil of lubricating viscosity. The amount of the sulfurized product being added to the oil will vary depending on the need of the lubricant and can be readily adjusted by one skilled in the art. The amount added might vary from 0.1 to 10%, preferably 0.25% to 5%, more preferably about 1% to 3% by weight based on the weight of the oil.

While the process of the present invention has been described in detail in conjunction with the treatment of a limited number of reactants under similar conditions for the purpose of valid comparisons and of fully illustrating this invention, it will be readily apparent to those skilled in the art that numerous modifications and variations of the process relative to specific reactants, and reaction conditions are within the purview of this invention. Accordingly, the present invention should not be construed as limited in any particulars except as may be set forth in the appended claims or required by the prior art. For example, a variety of different temperatures, times, pressures and protic solvents or mixtures thereof could be used and various adjustments may be required in order to carry out the process on a manufacturing scale.

We claim:
1. A process for producing a sulfurized olefin comprising the steps of:
   dehydrohalogenating an olefin/sulfur halide complex by contacting the complex with a protic solvent in the absence of any metal ions at a temperature in the range of 60° C. to 160° C. and thereby removing halogens from the sulfurized complex and providing a dehalogenated sulfurized olefin; and
   isolating the sulfurized olefin.
2. The process as claimed in claim 1, wherein the olefin is an alkylene compound containing one double bond and 2 to 50 carbon atoms, and the sulfur halide is a sulfur chloride.
3. The process as claimed in claim 1, wherein the olefin is a mixture of olefins containing isobutene and the sulfur halide is selected from the group consisting of sulfur monochloride, sulfur dichloride and mixtures thereof and the protic solvent is selected from the group consisting of water, alcohols, carboxylic acids and combinations thereof.

4. The process as claimed in claim 1, wherein the olefin contains one double bond and 2 to 50 carbons and the sulfur halide is a sulfur chloride.

5. The process as claimed in claim 4, wherein the olefin is isobutene and the sulfur halide is sulfur monochloride, and the protic solvent is water, and the dehydrohalogenating is carried out at a pressure in the range of 0.75 atmospheres to superatmospheric pressure.

6. The process as claimed in claim 1, wherein the protic solvent is selected from the group consisting of carboxylic acids and alcohols containing 1 to 18 carbons.

7. The process as claimed in claim 1, wherein the olefin/sulfur halide complex is formed by reacting an olefin in the presence of a sulfur halide in the absence of a metal containing catalyst to obtain the olefin/sulfur halide complex free of ash containing contaminants.

8. The process as claimed in claim 1, further comprising:
    contacting the isolated sulfurizing olefin with a basic compound.

9. The process as claimed in claim 7, further comprising:
    contacting the isolated sulfurized olefin with more protic solvent to further dehalogenate and isolate the olefin.

10. The process as claimed in claim 8, wherein the basic compound is an inorganic caustic selected from the group consisting of sodium hydroxide and sodium sulfide.

11. A process for producing a sulfurized olefin product comprising the steps of:
    dehydrohalogenating an olefin/sulfur halide complex by contacting the complex with a protic solvent, in the presence of not more than a catalytic amount of metal ions based on the amount of halide present at a temperature in the range of 60° C. to 160° C., in order to remove halogens from the sulfurized complex and provide the sulfurized olefin product; and
    isolating the sulfurized olefin product wherein the olefin is a mixture of olefins containing isobutene and the sulfur halide is selected from the group consisting of sulfur monochloride, sulfur dichloride and mixtures thereof and the protic solvent is selected from the group consisting of water, alcohols, carboxylic acids and combinations thereof.

12. The process as claimed in claim 11, further comprising:
    contacting the isolated sulfurized olefin product with an inorganic caustic.

13. The process as claimed in claim 11, further comprising:
    contacting the isolated olefin product with more protic solvent and isolating the olefin.

14. A process for sulfurizing an olefin comprising the steps of:
    contacting an olefin with a sulfur halide in the absence of a metal containing catalyst to obtain a sulfurized complex;
    contacting the sulfurized complex with a protic solvent, in the presence of not more than a catalytic amount of metal ions, at a temperature in the range of 60° C. to 160° C., to remove halogens from the sulfurized complex and provide a sulfurized olefin; and
    isolating the sulfurized olefin.

15. The process as claimed in claim 14, wherein the olefin is isobutene and the protic solvent is water.

16. A process for producing a sulfurized olefin, comprising the steps of:
    contacting an olefin/sulfur halide complex with water and heating;
    allowing the water to separate as an aqueous phase and removing at least a portion of the aqueous phase;
    adding additional water and heating;
    allowing the water to separate a second time as an aqueous phase and again removing at least a portion of the aqueous phase.

17. The process of claim 16 further comprising:
    adding a dehydrating catalyst after allowing the water to separate the second time and heating under a vacuum.

18. The process of claim 16, wherein the heating is to a temperature in the range of 80° C. to 110° and after each aqueous phase is allowed to separate, substantially all of each of the aqueous phases is removed.

19. The process of claim 18, wherein the dehydrating catalyst is in the form of a sulfonated polystyrene and the olefin/sulfur halide complex is in the form of an isobutene/sulfur chloride complex.

20. The process of claim 16, wherein the molar ratio of water added at each step to halide present in the complex is in the range of (1–50):(1–2).

21. The process of claim 19, wherein the molar ratio of water added at each step to chloride present in the complex before contacting any water is in the range of (1–10):1.

* * * * *